United States Patent [19]

Souza

[11] 4,345,700
[45] Aug. 24, 1982

[54] VARIABLE QUANTITY DISPENSING DEVICE FOR GRANULAR MATERIAL

[75] Inventor: David W. Souza, Fremont, Calif.

[73] Assignee: SJ Marketing Incorporated, Palo Alto, Calif.

[21] Appl. No.: 144,226

[22] Filed: Apr. 28, 1980

[51] Int. Cl.³ ............................................... G01F 11/46
[52] U.S. Cl. ..................................... 222/438; 222/452
[58] Field of Search ......................... 222/434, 438, 452

[56] References Cited

U.S. PATENT DOCUMENTS

| | | | |
|---|---|---|---|
| 928,052 | 7/1909 | Hirsch | 222/452 |
| 1,901,487 | 3/1933 | Alexander | 222/452 |
| 2,877,937 | 3/1959 | Weir | 222/452 |
| 3,179,303 | 4/1965 | Dankoff et al. | 222/452 X |
| 3,207,371 | 9/1965 | Stone | 222/452 X |
| 4,174,058 | 11/1979 | Bassignani | 222/452 X |

FOREIGN PATENT DOCUMENTS

| | | | |
|---|---|---|---|
| 1411 | 4/1979 | European Pat. Off. | 222/438 |
| 84450 | 8/1954 | Norway | 222/305 |

*Primary Examiner*—Robert J. Spar
*Assistant Examiner*—Frederick R. Handren
*Attorney, Agent, or Firm*—Harris Zimmerman; Howard Cohen

[57] ABSTRACT

A device for dispensing a selectively variable measured quantity of granular material from a container includes a cap adapted to be secured to the open end of the container, the cap including a generally cup-like coffer disposed in the neck of the container. A disk-like lid is rotatably secured to the cap in coaxial fashion, and includes a discharge port subtending a small angle therein. The cap includes a boss projecting radially inwardly in the coffer and disposed directly adjacent to an inlet port in the inner end wall of the coffer. An adjustment member is rotatably received in the coffer, and includes a radially extending wall parallel to the axis which is selectively variably spaced from the boss to define a chamber of variable volume communicating with the inlet port. A disk-like bottom cover includes an inlet opening therein, and is secured to the inner end of the cap and adapted for rotation in concert with the lid. With the container in the inverted position, granular material therein will fall gravitally through the opening in the bottom cover and the inlet port in the cap to fill the chamber in the coffer thereof to the extent permitted by the position of the wall of the adjustment member. The lid is rotated so that the bottom cover occludes the inlet port, after which the discharge port in the lid comes into registration with the chamber. The contents of the chamber fall gravitally through the discharge port, and spring means return the lid and bottom cover to their original angular positions.

13 Claims, 8 Drawing Figures

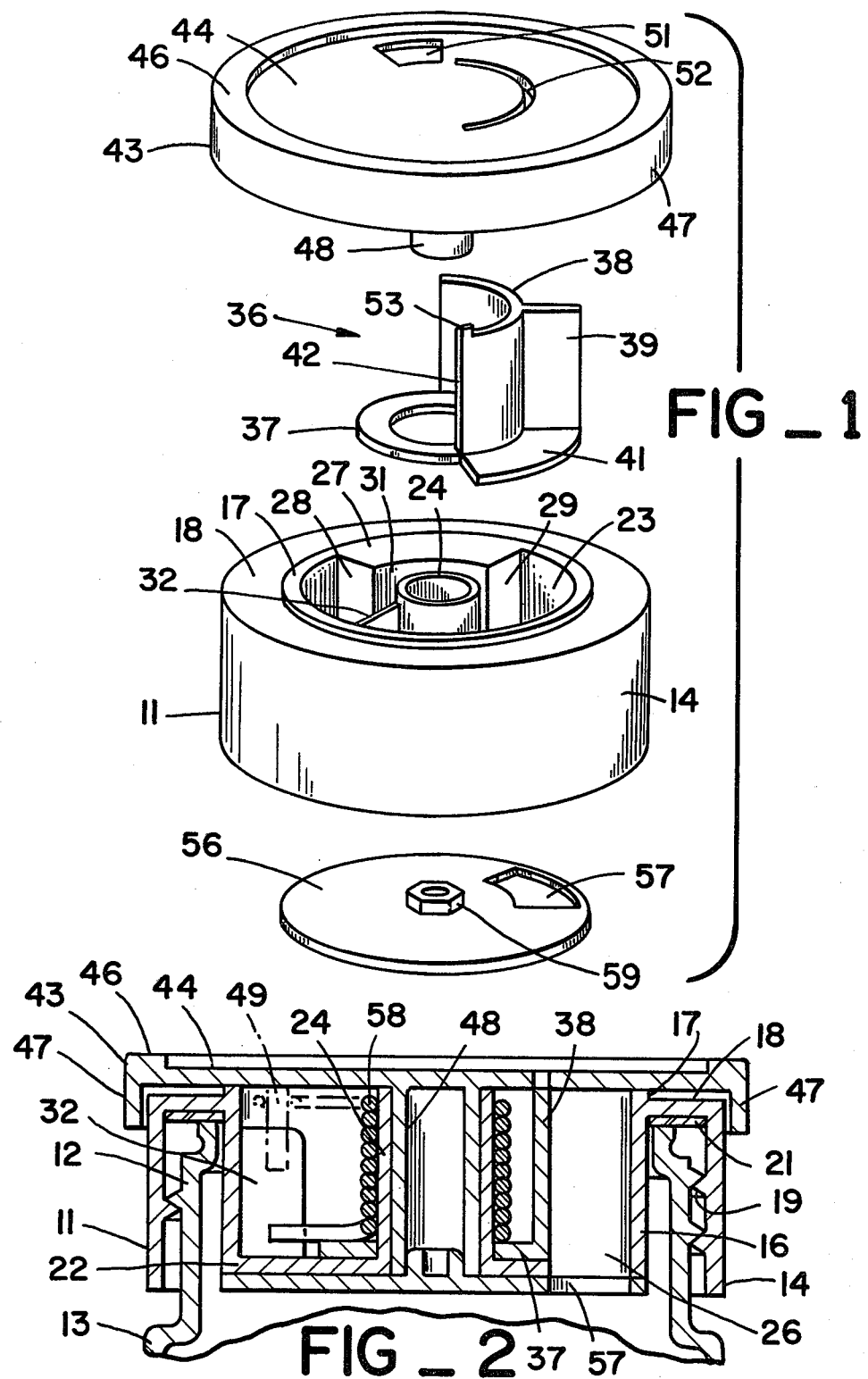

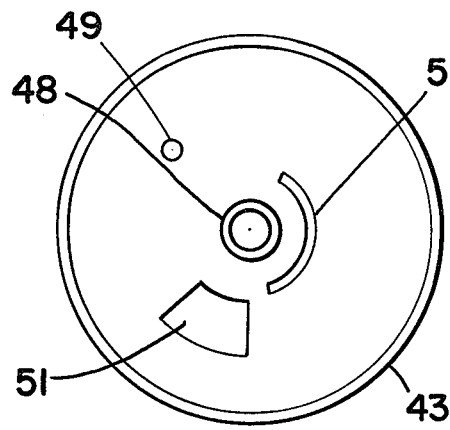
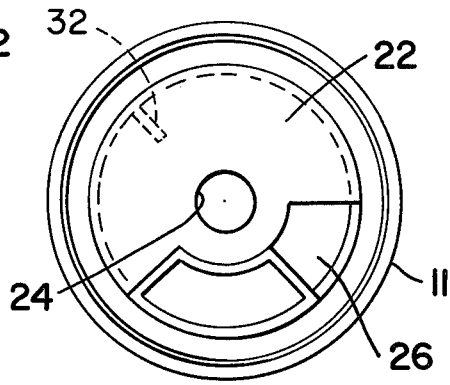
FIG_3  FIG_4
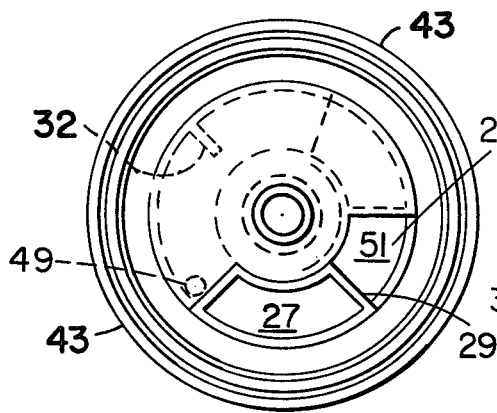
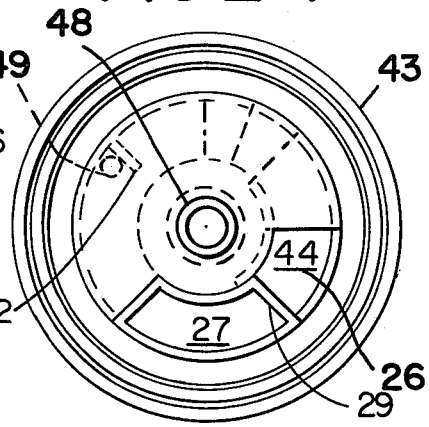
FIG_7  FIG_8
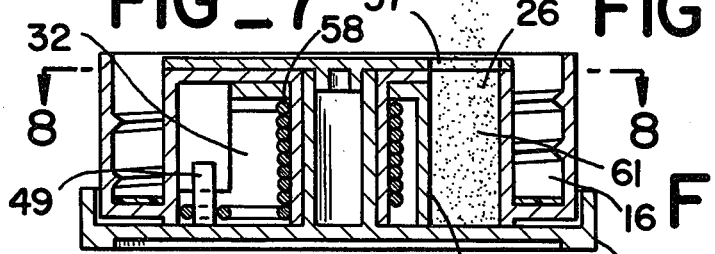
FIG_5
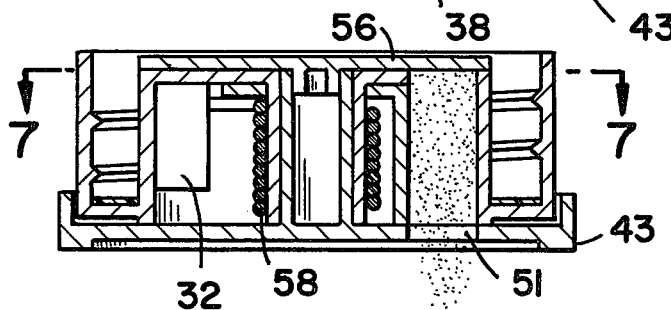
FIG_6

VARIABLE QUANTITY DISPENSING DEVICE FOR GRANULAR MATERIAL

BACKGROUND OF THE INVENTION

Many granular comestible products, such as instant beverage mixes, are sold in jars which are closed by threaded caps. The quality of the granular comestible product deteriorates rapidly upon exposure to air, due in part to the large surface area of the granular composition. Thus, many instant beverage products are packed using an inner seal to exclude any contact with ambient air during shipping and marketing. However, the inner seal must be removed to make use of the product; thereafter, the jar cap must be relied upon to preserve the freshness and flavor of the product. Ironically, the cap must be removed from the jar each time it is desired to use the product. Removing and resecuring the jar cap is a minor inconvenience to the user of the product, but repeated opening of the jar exposes the contents thereof to large amounts of moisture, and oxygen-laden ambient air. For example, a large jar of instant coffee may be opened and resealed as many as two hundred times before the contents of the jar are completely used. Renewing the oxygen and humidity of the air within the jar two hundred times causes a serious deterioration in the flavor, aroma, and freshness of the product.

There are known in the prior art various devices for dispensing granular materials from a jar or other container. The following U.S. Patents comprise the closest known prior art:

| | | |
|---|---|---|
| 2,530,730 | 3,308,995 | 3,258,174 |
| 3,866,805 | 3,414,172 | 2,535,845 |
| 3,836,055 | 4,159,791 | 2,515,735 |
| 2,507,557 | 3,211,334 | 3,716,173 |

Generally speaking, dispensing granular material with these devices involves inverting the jar to fill by gravital flow a chamber therein of known volume. In some of the devices, a lever or similar rotating member is then actuated to cause discharge of the granular material from the chamber. In other devices, the jar must be restored to its upright disposition; thereafter inversion of the jar will cause discharge of the granular material in the chamber.

A major drawback in some of the prior art devices is that the volume of granular material discharged in each dispensing operation is invariable. For example, if the chamber in the device has a volume of 1 teaspoon, the amount of material which may be dispensed from the device must be 1 teaspoon or a multiple thereof. For a reconstituted beverage product such as instant coffee, subtle variations in strength of the beverage to suit the particular tastes of a consumer thereof are not possible with many of the prior art dispensing devices.

To overcome this deficiency, some of the prior art devices have been designed to include a plurality of individual chambers which may be selectively filled and emptied during the dispensing process. As a result, some variation is obtainable in the amount of granular material which is dispensed by the device. However, these devices suffer from the same drawback as the non-variable dispensing devices, in that the amount which is dispensed is merely a multiple of the unit volume of one of the chambers in the device. These devices are more convenient in that they do not require reiterative dispensing procedures to discharge an amount of granular material which approximates the amount desired to be used.

In more specific terms, the prior art is devoid of a dispensing device for granular material which is secured to a jar or container thereof and adapted to dispense a variable amount of the granular material by rotation of a portion of the device while the container remains inverted.

SUMMARY OF THE PRESENT INVENTION

The present invention generally comprises a dispensing device which is adapted to be secured in the open end of a jar or container to dispense a selected amount of granular material stored within the jar. The device is particularly characterized by its ability to dispense a selectively variable amount of granular material by rotation of a portion of the device, while the jar remains closed to ambient air and the contaminants that are contained in the air.

The device includes a cap having an outer cylindrical side wall which is secured about the neck of the container by threads or the like. An inner cylindrical side wall extends from the cap into the neck of the container, and an end panel secured to the interior edge of the inner side wall defines therewith a cylindrical coffer. Extending coaxially and outwardly from the end panel is a tubular, hollow post. The end panel includes an inlet port which subtends a moderate angle thereof and is disposed adjacent to the periphery thereof.

A boss extends from the inner side wall inwardly into the coffer, and includes a pair of angularly spaced apart panels extending radially parallel to the axis of the coffer. One of the panels is disposed directly adjacent to the inlet port in the end panel of the coffer. A disk-like lid member is secured to the open, outer end of the coffer, and includes an axially extending tubular member which is rotatably received within the post extending from the interior end panel of the coffer. The lid member includes a discharge port which subtends a small angle thereof, as well as an annularly extending slot disposed therein.

A volume adjustment member is rotatably received about the cylindrical post, and includes an annular wall portion parallel to the cylindrical post and spaced outwardly therefrom. A radially disposed wall extends outwardly from the annular wall portion parallel to the axis of the coffer, and is in opposed relationship to one of the radial walls of the boss in the coffer. The radially extending walls, together with the annular wall portion and the inner cylindrical side wall, define a chamber having a volume which is variable according to the angular spacing of the radially extending walls. A volume adjustment arm extends from the annular wall portion outwardly through the slot in the lid member to facilitate angular positioning of the adjustment member and selective variation of the volume of the chamber.

The invention also includes a bottom cover secured to the interior surface of the end panel of the coffer. The bottom cover is secured to the tubular member of the lid member and is adapted for rotation therewith. The bottom cover includes an inlet port which is registrable with the inlet port of the coffer. A helical torsion spring is secured about the cylindrical post within the coffer, and is adapted resiliently to urge the lid member and bottom cover to rotate counterclockwise with respect to the cap.

The jar or container may be inverted so that granular material contained therein will fall gravitally through the inlet ports of the bottom cover and end panel to fill the variable volume chamber. With the container remaining in the inverted position, the lid is rotated clockwise with respect to the cap to bring the discharge port into registration with the variable volume chamber. At the same time, the bottom cover is rotated so that the inlet port of the coffer is occluded by the bottom cover. Thus only the charge of granular material which fills the variable volume chamber is dispensed in one dispensing operation. The volume to be dispensed from the chamber is selectively controlled by the adjustment arm which extends through the slot in the lid.

A BRIEF DESCRIPTION OF THE DRAWING

FIG. 1 is an exploded view of the dispensing device of the present invention.

FIG. 2 is a cross-sectional elevation of the dispensing device of the present invention.

FIG. 3 is a bottom view of the interior end of the lid member of the dispensing device.

FIG. 4 is a bottom view of the interior end of the cap of the dispensing device of the present invention.

FIG. 5 is a cross-sectional elevation of the dispensing device in an inverted position and disposed to be filled with granular material.

FIG. 6 is a cross-sectional elevation of the dispensing device in the inverted position and disposed to discharge granular material therefrom.

FIG. 7 is a cross-sectional view of the dispensing device taken along line 7—7 of FIG. 6.

FIG. 8 is a cross-sectional view of the dispensing device taken along line 8—8 of FIG. 5.

DESCRIPTION OF THE PREFERRED EMBODIMENT

The preferred embodiment of the dispensing device of the present invention includes a cap 11 which is adapted to be secured to the neck 12 of a jar or similar container 13. The cap 11 includes an outer cylindrical side wall 14 which is disposed concentrically about the neck 12 and is provided with internal threads 19 which engage the external threads of the neck. The cap includes an inner cylindrical side wall 16 which is joined to the outer side wall 14 by an annular portion 18 of the cap. The annular portion 18 extends perpendicularly to the axis of the side walls 14 and 16, and is disposed to provide a seat for a gasket seal 21 which impinges on the open mouth of the neck of the container. Extending outwardly from the annular portion 18 is a lip 17 which extends colinearly with the inner side wall 16 of the cap.

An end panel 22 is secured to the interior edge of the inner side wall 16 to define therewith an outwardly opening, cylindrical coffer 23. A hollow cylindrical post 24 extends outwardly and coaxially from the end panel 22, and is integrally formed therewith. The end panel 22 also includes a discharge port 26 which is adjacent to the periphery thereof and which subtends a moderate angle therein.

The cap 11 also includes a large, block-like protrusion 27 which extends from the side wall 16 inwardly into the coffer 23. The protrusion 27 includes radially extending, angularly spaced walls 28 and 29 which are joined by a cylindrical wall portion 31 spaced radially outwardly from the cylindrical post 24. The top panel of the protrusion 27 extends between the upper edges of the walls 28, 29, and 31, and is disposed flush with the outer extent of the lip 17. The radially extending wall 29 is disposed directly adjacent to one side of the discharge port 26. Also extending into the coffer 23 is a radially extending stop member 32 which is secured to the side wall 16 and is approximately diametrically opposed to the wall 29.

The device of the present invention also includes an adjustment member 36 which is received within the coffer 23. The adjustment member 36 includes an annular ring 37 which is received about the innermost portion of the cylindrical post 24 and is adapted for rotation thereabout. A cylindrical wall portion 38 extends coaxially from the annular ring 37, and is spaced radially outwardly from the post 24. The wall portion 38 subtends at an angle slightly less than 180°. Extending radially outwardly from a medial portion of the cylindrical wall portion 38 is a wall 39, both the walls 38 and 39 extending longitudinally parallel to the axis of the device. A wall 41 extends radially outwardly perpendicular to the axis of the device, and is integrally formed with the annular ring 37. The wall 41 joins the lower edge portions of the walls 38 and 39, and subtends an angle from the wall 39 to the edge 42 of the cylindrical wall portion 38.

It may be appreciated that the wall 39 is disposed adjacent to and in opposition to the wall 29 of the protrusion 27 in the coffer 23. The angular spacing of the wall 29 and 39 may be varied by rotating the adjustment member 36. As the wall 39 is rotated closer to the wall 29, the wall 41 of the adjustment member occludes a larger portion of the inlet port 26 of the coffer.

The device of the present invention also includes a lid member 43 comprising a disk 44 having a lip 46 extending continuously about the periphery thereof and extending outwardly therefrom. A cylindrical wall 47 extends coaxially from the disk 44, and is spaced slightly radially outwardly from the wall 14 of the cap 11. Extending coaxially inwardly from the disk 44 is a tubular member 48. The tubular member 48 is rotatably received within the cylindrical post 24 of the cap. A spring retaining post 49 extends inwardly from the inner surface of the disk 44, and is offset radially from the tubular member 48, as shown in FIG. 3. The lid 43 includes a discharge port 51 subtending a small angle therein and spaced medially between the tubular member 48 and the periphery of the disk 44. A circular slot 52 extends through the disk 44 concentrically with respect to the axis thereof, and is angularly spaced between the discharge port 51 and the spring post 49. An adjustment knob 53 extends outwardly from the cylindrical wall portion 38 of the adjustment member 36, and extends through the slot 52 of the lid 43. The knob 53 is adapted to be translated in the slot 52 to dispose the adjustment member in a desired angular position with respect to the protrusion 27 in the coffer 23.

A disk-like bottom cover 56 is secured directly adjacent to the inner surface of the end panel 22 of the cap. The bottom cover includes an inlet opening 57 extending from a medial portion thereof to the edge thereof and subtending a small angle therein. An hexagonal protrusion 59 is disposed coaxially on the bottom cover, and is adapted to be secured in a similarly shaped socket in the inner end of the tubular member 48 of the lid. Thus, the lid 43 and the bottom cover 56 are joined for common rotation with respect to the cap 11.

A helical torsion spring 58 is secured about the cylindrical post 24 of the cap, with the outer end thereof impinging on the spring retaining post 49. The inner end of the spring 58 impinges on the stop member 32 of the cap. The spring 58 is adapted to bias resiliently the lid and the bottom cover to rotate counterclockwise with respect to the cap 11 as viewed in FIG. 1. Rotation of the lid and the bottom cover is limited by impingement of the spring retaining member 49 upon the stop member 32, as shown in FIG. 8. In this disposition the inlet opening 57 of the bottom cover is in registration with the inlet port 26 of the cap. In this disposition the container 13 may be inverted, and the granular material contained therein will flow gravitally through the inlet opening 57 and the inlet port 26 into a chamber 61 defined by the cylindrical wall portion 38 and the cylindrical side wall 16, the radially extending walls 29 and 39, and the inner surface of the lid. In this disposition, shown in FIGS. 5 and 8, the spring retaining post 49 is resiliently urged by the spring 58 to impinge upon the stop member 32 of the cap.

With the container remaining in the inverted position, the contents of the chamber 61 may be dispensed from the device by rotating the lid 43 with respect to the cap 11 and the adjustment member 36. The lid 43 is rotated manually in the clockwise direction as viewed in FIG. 1, so that the discharge port 51 in the lid moves angularly toward the chamber 61. As this rotation commences, the inlet opening 57 of the bottom cover moves out of registration with the inlet port 26, and the bottom cover 56 closes the inlet port 26. Upon further rotation of the lid 43 (approximately 90°), the discharge port 51 moves into registration with the chamber 61, and the granular contents thereof falls gravitally through the discharge port, as shown in FIG. 6, into any desired cup or container. The lid 43 is then manually released, and the resilient force of the spring 58 restores the device to the disposition shown in FIGS. 5 and 8. If the container remains in the inverted position, the chamber 61 will be filled gravitally once more, and the dispensing procedure may be reiterated. Otherwise, the container may be returned to its upright position to await further use.

As noted in the foregoing, the chamber 61 has a volume which is varied according to the angular spacing of the wall 39 of the adjustment member, and the wall 29 of the cap. This angular spacing may be varied by manual rotation of the adjustment member using the knob 53 which extends upwardly through the slot 52 of the lid 43. For example, in the preferred embodiment the adjustment member may be rotated through an excursion of approximately 45° to vary the volume of the chamber from a minimum of one-half teaspoon to a maximum of one and one-half teaspoons. Of course, the range between maximum and minimum volumes of the chamber 61 may be extended by increasing the angular excursion through which the adjustment member may be rotated. The surface 44 of the lid 43 may be provided with indicia adjacent to the slot 52 to indicate the volume of the chamber 61 corresponding to the position of the knob 53 in the slot 52. Detent means operatively associated with the adjustment member 36 and the cap 11 may be provided to maintain the angular position of the adjustment member so that rotation of the lid 43 will not affect the angular position setting of the adjustment member.

It may be appreciated that the device of the present invention is virtually completely disposed within the neck of the container 13, so that the device does not significantly alter standard container sizes. Thus, packing and shipping of containers which include the dispensing device of the present invention in standard packing cartons is not affected by the presence of the dispensing device. The major components of the present invention may be fabricated by injection molding or similar mass production techniques, so that the device may be produced cheaply and assembled easily.

I claim:

1. A device for dispensing material from a container having an externally threaded neck forming an opening, comprising: a cap member having an annular internally threaded outer wall to be threadably secured to said neck, a cup-like coffer extending into said outer wall and opening outwardly therefrom, said coffer including an annular inner sidewall concentrically within and spaced from said outer wall, and an annular portion completely joining adjacent ends of said inner and outer walls; a protruding member extending into said coffer from the sidewall thereof; a lid member rotatably secured to said cap member, and having a circular disc top wall disposed to close the open end of said coffer and a depending integral annular wall surrounding said annular portion of said cap member; a discharge port in said lid member top wall; a disc bottom cover connected to said lid member for rotation therewith beneath and to close the bottom of said coffer; an inlet port in said bottom cover angularly spaced from said lid discharge port; an adjustable member rotatably secured within said coffer and including a radially extending wall angularly spaced from said protruding member; said protruding member, radially extending wall, sidewall, lid member, and bottom cover defining a chamber having a volume variable according to the angular position of said adjustable member relative to said cap member; said lid member being rotatable to selectively move said inlet opening into registration with said chamber in one position and to move said lid discharge port into registration with said chamber in another position angularly spaced from said one position; said cap member annular portion having sealing means for contacting the outer edge of the container neck; said lid member top wall being closely adjacent to and parallel to said cap member annular portion; and manually operable means extending through said lid member top wall for rotating said adjustment member relative to said lid member and said cap member.

2. The dispensing device of claim 1, wherein said coffer includes a hollow cylindrical post located centrally therein.

3. The dispensing device of claim 2, wherein said lid member includes a tubular member extending coaxially inwardly and rotatably received within said post of said coffer.

4. The dispensing device of claim 3, wherein said bottom cover is secured to the inner end of said tubular member of said lid member.

5. The dispensing device of claim 1, wherein said adjustment member includes an annular member rotatably secured about said cylindrical post.

6. The dispensing device of claim 5, wherein said adjustment member includes a curved wall portion joined to said annular member and spaced concentrically inwardly from said sidewall and outwardly from said post, said radially extending wall joining said curved wall portion and extending therefrom parallel to said axis.

7. The dispensing device of claim 6, further including a panel extending radially outwardly from said annular member perpendicular to said axis and joining the inner edges of said radially extending wall and said curved wall portion, said panel being disposed to occlude a selectively variable portion of said inlet port according to the angular position of said adjustment member.

8. The dispensing device of claim 1, wherein said manually operable means extends outwardly to terminate substantially coplanar with the outer surface of said lid member top wall.

9. The dispensing device of claim 6, further including a coil spring helically surrounding said cylindrical post and said tubular member, and concentrically within said adjustment member curved wall portion; said spring having a first terminal end drivingly connected to said lid member and a second terminal end drivingly connected to said cap member, to provide means for biasing said cap member into said one position; and said cap member and lid member having abutment means engaging in said one position to prevent further relative rotation in the direction of said bias.

10. The dispensing device of claim 9, wherein said helical spring axially engages the surface of said annular member of said adjustment member that faces said lid member, and the opposite surface of said annular member of said adjustment member engaging said cap member.

11. The dispensing device of claim 1, including an arcuate through slot in said lid member top wall concentric with its axis of rotation, and said manually operable means being a knob extending integrally from said adjustment member into said slot.

12. A device for dispensing material from a container having an opening, comprising a cap member secured to said opening and including a cap-like coffer extending into said container and opening outwardly therefrom, said coffer including a curved, continuous sidewall, an inner end wall and a hollow cylindrical post extending coaxially outwardly from said endwall; a protruding member extending into said coffer from the sidewall thereof; a lid member rotatably secured to said cap member and disposed to close the open end of said coffer; a discharge port in said lid member; an adjustment member rotatably secured within said coffer and including a radially extending wall angularly spaced from said protruding member; said protruding member, radially extending wall, sidewall, lid member, and endwall defining a chamber having a volume variable according to the angular position of said adjustment member; an inlet port in said endwall directly adjacent to said protruding member and communicating with said chamber; a bottom cover impinging on the inner surface of said endwall and secured to said lid member for rotation in concert therewith, said bottom cover including an inlet opening registering with said inlet port; said lid member being rotatable to move said inlet opening out of registration with said inlet port and to move said discharge port into registration with said chamber; said adjustment member including an annular member rotatably secured about said cylindrical post and a curved wall portion joined to said annular member and spaced concentrically inwardly from said sidewall and outwardly from said post, and having said radially extending wall joining said curved wall portion and extending therefrom parallel to said axis; and spring means disposed within the annular space between said cylindrical post and said curved wall portion, said spring means being operatively associated with said lid member and said cap to resist resiliently manual rotation of said lid member.

13. A device for dispensing material from a container having an opening, comprising a cap member secured to said opening and including a cap-like coffer extending into said container and opening outwardly therefrom, said coffer including a curved, continuous sidewall, an inner end wall and a hollow cylindrical post extending coaxially outwardly from said endwall; a protruding member extending into said coffer from the sidewall thereof; a lid member rotatably secured to said cap member and disposed to close the open end of said coffer; a discharge port in said lid member; an adjustment member rotatably secured within said coffer and including a radially extending wall angularly spaced from said protruding member; said protruding member, radially extending wall, sidewall, lid member, and endwall defining a chamber having a volume variable according to the angular position of said adjustment member; an inlet port in said endwall directly adjacent to said protruding member and communicating with said chamber; a bottom cover impinging on the inner surface of said endwall and secured to said lid member for rotation in concert therewith, said bottom cover including an inlet opening registering with said inlet port; said lid member being rotatable to move said inlet opening out of registration with said inlet port and to move said discharge port into registration with said chamber; said adjustment member including an annular member rotatably secured about said cylindrical post and a curved wall portion joined to said annular member and spaced concentrically inwardly from said sidewall and outwardly from said post, and having said radially extending wall joining said curved wall portion and extending therefrom parallel to said axis; and an arcuate slot formed in said lid member, and a knob protruding from said curved wall portion and extending outwardly through said arcuate slot to facilitate manual rotation of said adjustment member.

* * * * *